(12) United States Patent
Takubo et al.

(10) Patent No.: US 10,881,913 B2
(45) Date of Patent: Jan. 5, 2021

(54) GOLF BALL

(71) Applicant: SUMITOMO RUBBER INDUSTRIES, LTD., Kobe (JP)

(72) Inventors: Toshiyuki Takubo, Kobe (JP); Takahiro Sajima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/784,845

(22) Filed: Feb. 7, 2020

(65) Prior Publication Data

US 2020/0269093 A1   Aug. 27, 2020

(30) Foreign Application Priority Data

Feb. 22, 2019   (JP) .................. 2019-030325

(51) Int. Cl.
| | |
|---|---|
| *A63B 37/06* | (2006.01) |
| *A63B 37/00* | (2006.01) |
| *B29C 45/26* | (2006.01) |
| *B29C 45/16* | (2006.01) |
| *B29C 45/00* | (2006.01) |
| *B29C 45/14* | (2006.01) |
| *B29L 31/54* | (2006.01) |
| *B29K 9/00* | (2006.01) |

(Continued)

(52) U.S. Cl.
CPC ...... *A63B 37/0005* (2013.01); *A63B 37/0015* (2013.01); *A63B 37/0021* (2013.01); *A63B 37/0022* (2013.01); *B29C 45/0053* (2013.01); *B29C 45/1671* (2013.01); *B29C 45/263* (2013.01); *A63B 37/0007* (2013.01); *A63B 37/0019* (2013.01); *A63B 37/0096* (2013.01); *B29C 45/14819* (2013.01); *B29C 2045/0079* (2013.01); *B29K 2009/00* (2013.01); *B29K 2033/08* (2013.01); *B29K 2509/02* (2013.01); *B29L 2031/546* (2013.01)

(58) Field of Classification Search
CPC ........................ A63B 37/0005; A63B 37/0004
USPC ........................................... 473/378
See application file for complete search history.

(56) References Cited

U.S. PATENT DOCUMENTS

| | | | | |
|---|---|---|---|---|
| 5,916,044 A | * | 6/1999 | Shimosaka | ........ A63B 37/0004 473/377 |
| 6,179,731 B1 | * | 1/2001 | Shimosaka | ........ A63B 37/0004 473/378 |

(Continued)

FOREIGN PATENT DOCUMENTS

| | | |
|---|---|---|
| JP | 2-68077 A | 3/1990 |
| JP | 2011-72776 A | 4/2011 |

(Continued)

*Primary Examiner* — Raeann Gorden
(74) *Attorney, Agent, or Firm* — Birch, Stewart, Kolasch & Birch, LLP

(57) ABSTRACT

A golf ball has a large number of exposed portions 22 on a surface thereof. An average value Hav of heights H of these exposed portions 22 is not less than 0.5 μm and not greater than 50 μm. The surface of the golf ball has one or more first zones and one or more second zones. An average value Hav1 of the heights H of the exposed portions 22 on these first zones is higher than an average value Hav2 of the heights H of the exposed portions 22 on these second zones. Preferably, the average value Hav1 and the average value Hav2 satisfy the following mathematical formula.

$$3 \leq (\text{Hav1} - \text{Hav2}) \leq 50$$

14 Claims, 13 Drawing Sheets

(51) Int. Cl.
  *B29K 33/00*    (2006.01)
  *B29K 509/02*   (2006.01)

(56) References Cited

U.S. PATENT DOCUMENTS

| | | | |
|---|---|---|---|
| 2002/0094886 A1* | 7/2002 | Sajima | A63B 37/0004 473/378 |
| 2005/0037871 A1* | 2/2005 | Nardacci | A63B 37/0021 473/378 |
| 2011/0077106 A1 | 3/2011 | Fitchett | |
| 2015/0182805 A1 | 7/2015 | Sajima et al. | |
| 2015/0375058 A1* | 12/2015 | Kamino | A63B 37/0077 473/374 |
| 2016/0067552 A1* | 3/2016 | Hixenbaugh | A63B 37/0015 473/383 |

FOREIGN PATENT DOCUMENTS

| | | |
|---|---|---|
| JP | 2014-520654 A | 8/2014 |
| JP | 2015-142599 A | 8/2015 |
| WO | WO 2013/012796 A2 | 1/2013 |

\* cited by examiner

GOLF BALL

CROSS-REFERENCE TO RELATED APPLICATION

This application claims priority on and the benefit of Patent Application No. 2019-030325 filed in JAPAN on Feb. 22, 2019. The entire disclosures of this Japanese Patent Application are hereby incorporated by reference.

BACKGROUND OF THE INVENTION

Field of the Invention

The present invention relates to golf balls. Specifically, the present invention relates to golf balls each having minute projections on the surface thereof.

Description of the Related Art

The face of a golf club has a loft angle. When a golf ball is hit with the golf club, backspin due to the loft angle occurs in the golf ball. The golf ball flies with the backspin.

Golf balls have a large number of dimples on the surfaces thereof. The dimples disturb the air flow around the golf ball during flight to cause turbulent flow separation. This phenomenon is referred to as "turbulization". Due to turbulization, separation points of the air from the golf ball shift backwards leading to a reduction of drag. The turbulization promotes the displacement between the separation point on the upper side and the separation point on the lower side of the golf ball, which results from the backspin, thereby enhancing the lift force that acts upon the golf ball. The reduction of drag and the enhancement of lift force are referred to as a "dimple effect". Excellent dimples efficiently disturb the air flow. Excellent dimples produce a long flight distance. Golf players desire a large flight distance.

Golf players also place importance on spin performance of golf balls. When the rate of backspin is high, the run is short. By using a golf ball having a high backspin rate, a golf player can cause the golf ball to stop at a target point. When the rate of sidespin is high, the golf ball tends to curve. By using a golf ball having a high sidespin rate, a golf player can intentionally cause the golf ball to curve. A golf ball having excellent spin performance has excellent controllability. In particular, golf players place importance on controllability upon a shot with a short iron.

JP2015-142599 discloses a golf ball having a surface with large roughness. The roughness can be formed by blasting or the like. The roughness enhances the aerodynamic characteristics of the golf ball due to a synergetic effect with dimples.

JP2011-72776 discloses a golf ball having a coating formed from a paint that contains particles. The particles enhance the aerodynamic characteristics of the golf ball due to a synergetic effect with dimples.

JPH2-68077 discloses a golf ball having dimples each having one projection at a bottom thereof. The dimples each having the projection enhance the aerodynamic characteristics of the golf ball.

JP2014-520654 discloses a golf ball including a coating with a micro surface roughness. The surface of the golf ball has a zone having a high roughness and a zone having a low roughness. The coating enhances the aerodynamic characteristics of the golf ball.

To obtain a large flight distance upon a shot with a driver, long flight duration is required. The flight duration of a golf ball launched at a large angle is long. In order to achieve a large launch angle, a weak golf player tends to use a golf club having a large loft angle. However, when a golf ball is hit with this golf club, the golf ball flies with a high spin rate. The high spin rate causes rising of the golf ball during flight. With a trajectory in which the rising occurs, a large flight distance cannot be achieved.

An object of the present invention is to provide a golf ball that has excellent controllability upon a shot with a short iron and that is excellent in flight distance upon a shot with a driver by a weak golf player.

SUMMARY OF THE INVENTION

A golf ball according to the present invention includes a core and a cover positioned outside the core. The cover has a plurality of minute projections on a surface thereof. Each minute projection has an exposed portion that is exposed on a surface of the golf ball. An average value Hav of heights H of the exposed portions is not less than 0.5 μm and not greater than 50 μm. The surface of the golf ball has one or more first zones and one or more second zones. An average value Hav1 of the heights H of the exposed portions on the first zones is higher than an average value Hav2 of the heights H of the exposed portions on the second zones.

With the golf ball according to the present invention, the exposed portions reduce the lift force of the golf ball during flight. When a weak golf player hits the golf ball with a driver, rising of the golf ball is suppressed during flight. Furthermore, the exposed portions also reduce drag. Therefore, with the golf ball, a large flight distance is obtained.

When the golf ball is hit with a short iron, energy is transmitted from the club to the ball due to collision of the ball with the clubface of the club. The exposed portions reduce loss of the energy. The golf ball flies with a high spin rate. Therefore, the golf ball has excellent controllability.

Preferably, a ratio S1 of a total area of the first zones to a surface area of a phantom sphere of the golf ball and a ratio S2 of a total area of the second zones to the surface area of the phantom sphere of the golf ball satisfy the following mathematical formula.

$$1 \leq (S1/S2) \leq 19$$

Preferably, the average value Hav1 and the average value Hav2 satisfy the following mathematical formula.

$$3 \leq (\text{Hav}1 - \text{Hav}2) \leq 50$$

Preferably, an arithmetic average height Sa1 of each first zone is larger than an arithmetic average height Sa2 of any second zone. Preferably, a maximum height Sz1 of each first zone is larger than a maximum height Sz2 of any second zone.

The golf ball may further include a paint layer partially covering the cover. The exposed portions project from the paint layer.

According to another aspect, a golf ball including a core and a cover positioned outside the core is produced by a production method according to the present invention. This production method includes the steps of:

Introducing a material into a mold having a plurality of minute recesses on a cavity face thereof; and Forming the cover having exposed portions having a shape that is an inverted shape of the minute recesses, from the material. An average value Hav of heights H of the exposed portions is not less than 0.5 μm and not greater than 50 μm. A surface of the golf ball has one or more first zones and one or more second zones. An average value Hav1 of the heights H of the exposed portions on the first zones is higher than an average value Hav2 of the heights H of the exposed portions on the second zones.

According to still another aspect, a golf ball including a core and a cover positioned outside the core is produced by a production method according to the present invention. This production method includes the steps of:

introducing a material into a mold having a plurality of minute recesses on a cavity face thereof;

forming the cover having minute projections having a shape that is an inverted shape of the minute recesses, from the material; and forming a paint layer on a surface of the cover such that parts of the minute projections are exposed from the paint layer to form exposed portions. An average value Hav of heights H of the exposed portions is not less than 0.5 μm and not greater than 50 μm. A surface of the golf ball has one or more first zones and one or more second zones. An average value Hav1 of the heights H of the exposed portions on the first zones is higher than an average value Hav2 of the heights H of the exposed portions on the second zones.

DESCRIPTION OF THE PREFERRED EMBODIMENTS

The following will describe in detail the present invention based on preferred embodiments with appropriate reference to the drawings.

Figure 1:
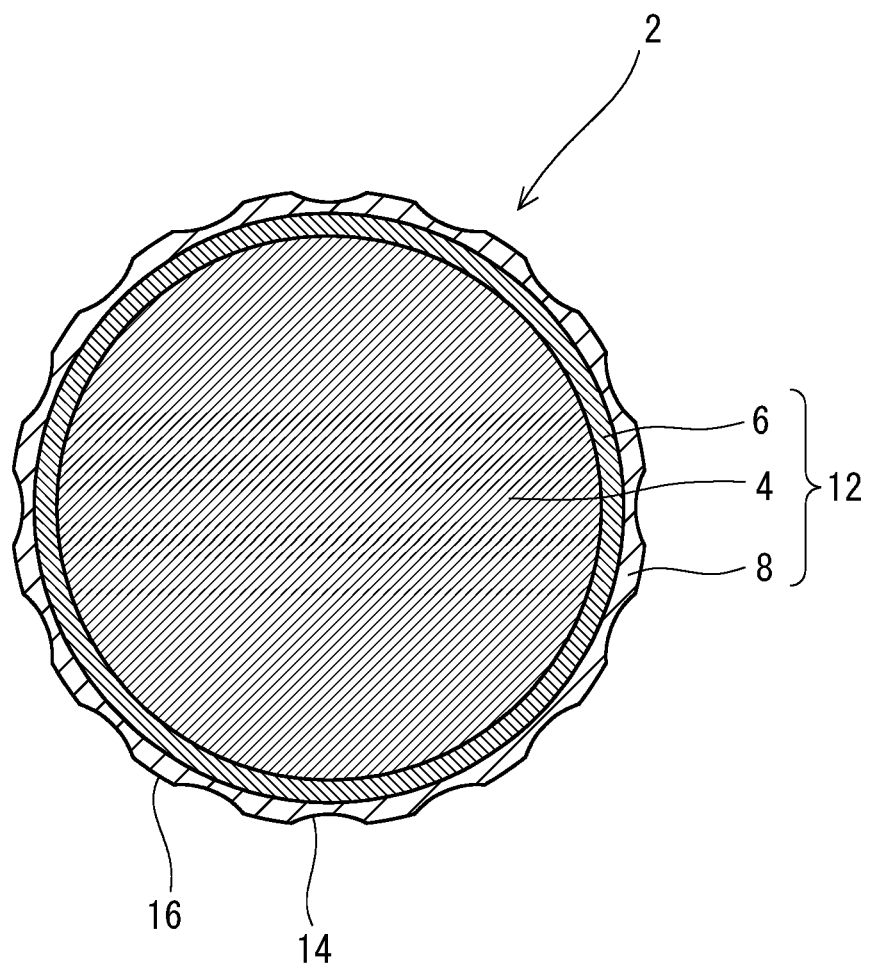
FIG. 1 is a cross-sectional view of a golf ball according to an embodiment of the present invention.

A golf ball 2 shown in FIG. 1 includes a spherical core 4, a mid layer 6 positioned outside the core 4, and a cover 8 positioned outside the mid layer 6. The core 4, the mid layer 6, and the cover 8 are included in a main body 12 of the golf ball 2. The golf ball 2 does not have a paint layer. The golf ball 2 has a large number of dimples 14 on the surface thereof. Of the surface of the golf ball 2, a part other than the dimples 14 is a land 16. The main body 12 may have a one-piece structure, a two-piece structure, a four-piece structure, a five-piece structure, or the like.

The golf ball 2 preferably has a diameter of not less than 40 mm and not greater than 45 mm. From the viewpoint of conformity to the rules established by the United States Golf Association (USGA), the diameter is particularly preferably not less than 42.67 mm. In light of suppression of air resistance, the diameter is more preferably not greater than 44 mm and particularly preferably not greater than 42.80 mm. The diameter of the golf ball 2 according to the present embodiment is 42.7 mm.

The golf ball 2 preferably has a weight of not less than 40 g and not greater than 50 g. In light of attainment of great inertia, the weight is more preferably not less than 44 g and particularly preferably not less than 45.00 g. From the viewpoint of conformity to the rules established by the USGA, the weight is particularly preferably not greater than 45.93 g.

Preferably, the core 4 is formed by crosslinking a rubber composition. Examples of the base rubber of the rubber composition include polybutadienes, polyisoprenes, styrene-butadiene copolymers, ethylene-propylene-diene copolymers, and natural rubbers. Two or more rubbers may be used in combination. In light of resilience performance, polybutadienes are preferable, and high-cis polybutadienes are particularly preferable.

The core 4 may be formed from a resin composition. The core 4 may be formed from a mixture of a rubber composition and a resin composition. A resin composition that will be described later for the mid layer 6 or the cover 8 can be used for the core 4.

The rubber composition of the core 4 includes a co-crosslinking agent. Examples of preferable co-crosslinking agents in light of resilience performance include zinc acrylate, magnesium acrylate, zinc methacrylate, and magnesium methacrylate. The rubber composition preferably includes an organic peroxide together with a co-crosslinking agent. Examples of preferable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide.

The rubber composition of the core 4 may include additives such as a filler, sulfur, a vulcanization accelerator, a sulfur compound, an anti-aging agent, a coloring agent, a plasticizer, and a dispersant. The rubber composition may include a carboxylic acid or a carboxylate. The rubber composition may include synthetic resin powder or crosslinked rubber powder.

The core 4 has a diameter of preferably not less than 30.0 mm and particularly preferably not less than 38.0 mm. The diameter of the core 4 is preferably not greater than 42.0 mm and particularly preferably not greater than 41.5 mm. The core 4 may have two or more layers. The core 4 may have a rib on the surface thereof. The core 4 may be hollow.

The mid layer 6 is formed from a resin composition. A preferable base polymer of the resin composition is an ionomer resin. Examples of preferable ionomer resins include binary copolymers formed with an α-olefin and an α,β-unsaturated carboxylic acid having 3 to 8 carbon atoms. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. For the binary copolymer and the ternary copolymer, preferable α-olefins are ethylene and propylene, while preferable α,β-unsaturated carboxylic acids are acrylic acid and methacrylic acid. In the binary copolymer and the ternary copolymer, some of the carboxyl groups are neutralized with metal ions. Examples of metal ions for use in neutralization include sodium ions, potassium ions, lithium ions, zinc ions, calcium ions, magnesium ions, aluminum ions, and neodymium ions.

Instead of an ionomer resin or together with an ionomer resin, the resin composition of the mid layer 6 may include another polymer. Examples of the other polymer include polystyrenes, polyamides, polyesters, polyolefins, and polyurethanes. The resin composition may include two or more polymers.

The resin composition of the mid layer 6 may include a coloring agent such as titanium dioxide, a filler such as barium sulfate, a dispersant, an antioxidant, an ultraviolet absorber, a light stabilizer, a fluorescent material, a fluorescent brightener, and the like. For the purpose of adjusting specific gravity, the resin composition may include powder of a metal with a high specific gravity such as tungsten, molybdenum, and the like.

The mid layer 6 has a thickness of preferably not less than 0.2 mm and particularly preferably not less than 0.3 mm. The thickness of the mid layer 6 is preferably not greater than 2.5 mm and particularly preferably not greater than 2.2 mm. The mid layer 6 has a specific gravity of preferably not less than 0.90 and particularly preferably not less than 0.95. The specific gravity of the mid layer 6 is preferably not greater than 1.10 and particularly preferably not greater than 1.05. The mid layer 6 may have two or more layers.

The cover 8 is formed from a thermoplastic resin composition, a thermosetting resin composition, or a mixture of both compositions. Preferably, the cover 8 is formed from a thermoplastic resin composition. Examples of the base polymer of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. Ionomer resins are particularly preferable. Ionomer resins are highly elastic. The golf ball 2 having the cover 8 that includes an ionomer resin has excellent resilience performance. The golf ball 2 has excellent flight distance upon a shot with a driver. The ionomer resin described above for the mid layer 6 can be used for the cover 8.

An ionomer resin and another resin may be used in combination. In this case, in light of resilience performance, the ionomer resin is included as the principal component of the base polymer. The proportion of the ionomer resin to the entire base polymer is preferably not less than 50% by weight, more preferably not less than 70% by weight, and particularly preferably not less than 80% by weight.

The resin composition of the cover 8 may include a pigment. The resin composition can include an inorganic pigment and an organic pigment. Examples of the inorganic pigment include: red pigments such as iron oxide red ($Fe_2O_3$), red lead ($Pb_3O_4$), molybdenum red, and cadmium red; yellow pigments such as titanium yellow ($TiO_2$—NiO—$Sb_2O_3$), litharge (PbO), chrome yellow ($PbCrO_4$), yellow iron oxide (FeO(OH)), and cadmium yellow; and blue pigments such as cobalt blue ($CoO.Al_2O_3$), Prussian blue, and ultramarine blue. Examples of the organic pigment include azo pigments, phthalocyanine pigments, and perylene pigments. Azo pigments are preferable. Examples of azo pigments include pigment yellow 1, pigment yellow 12, pigment red 3, pigment red 57, and pigment orange 13.

The resin composition of the cover 8 may include a filler, a dispersant, an antioxidant, an ultraviolet absorber, a light stabilizer, a fluorescent material, a fluorescent brightener, and the like in an adequate amount.

The cover 8 has a thickness of preferably not less than 0.2 mm and particularly preferably not less than 0.3 mm. The thickness of the cover 8 is preferably not greater than 2.5 mm and particularly preferably not greater than 2.2 mm. The cover 8 has a specific gravity of preferably not less than 0.90 and particularly preferably not less than 0.95. The specific gravity of the cover 8 is preferably not greater than 1.10 and particularly preferably not greater than 1.05. The cover 8 may have two or more layers.

Figure 2:
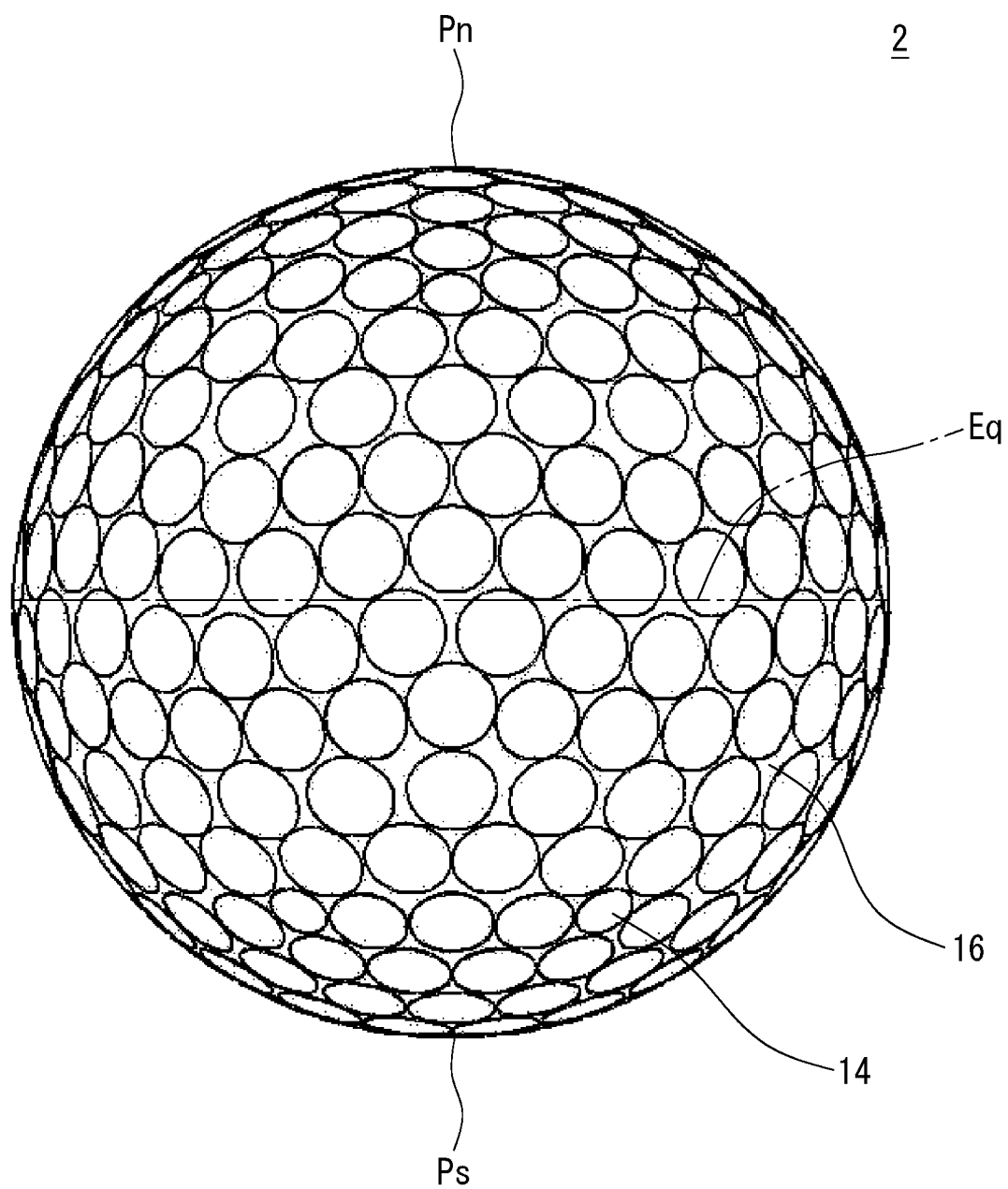
FIG. 2 is an enlarged front view of the golf ball in FIG. 1.
Figure 3:
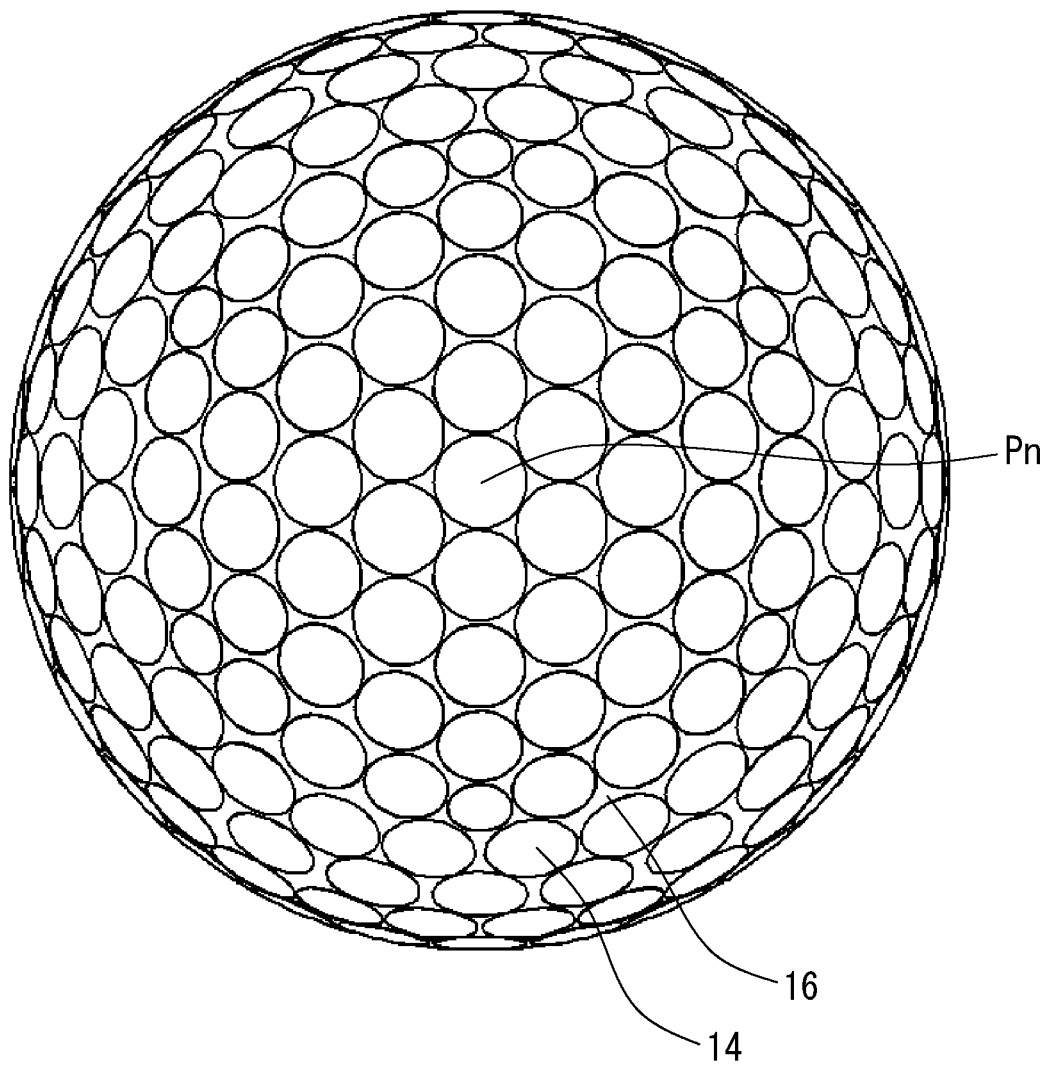
FIG. 3 is a plan view of the golf ball in FIG. 2.

FIG. 2 is an enlarged front view of the golf ball 2 in FIG. 1, and FIG. 3 is a plan view of the golf ball 2. As described above, the golf ball 2 has a large number of the dimples 14 on the surface thereof. The contour of each dimple 14 is circular. The golf ball 2 has a plurality of types of the dimples 14 having different diameters. The total number of the dimples 14 is 338. The golf ball 2 may have non-circular dimples instead of the circular dimples 14 or together with circular dimples 14. In FIG. 2, reference character Eq indicates an equator, reference character Pn indicates a north pole, and reference character Ps indicates a south pole.

Figure 4:
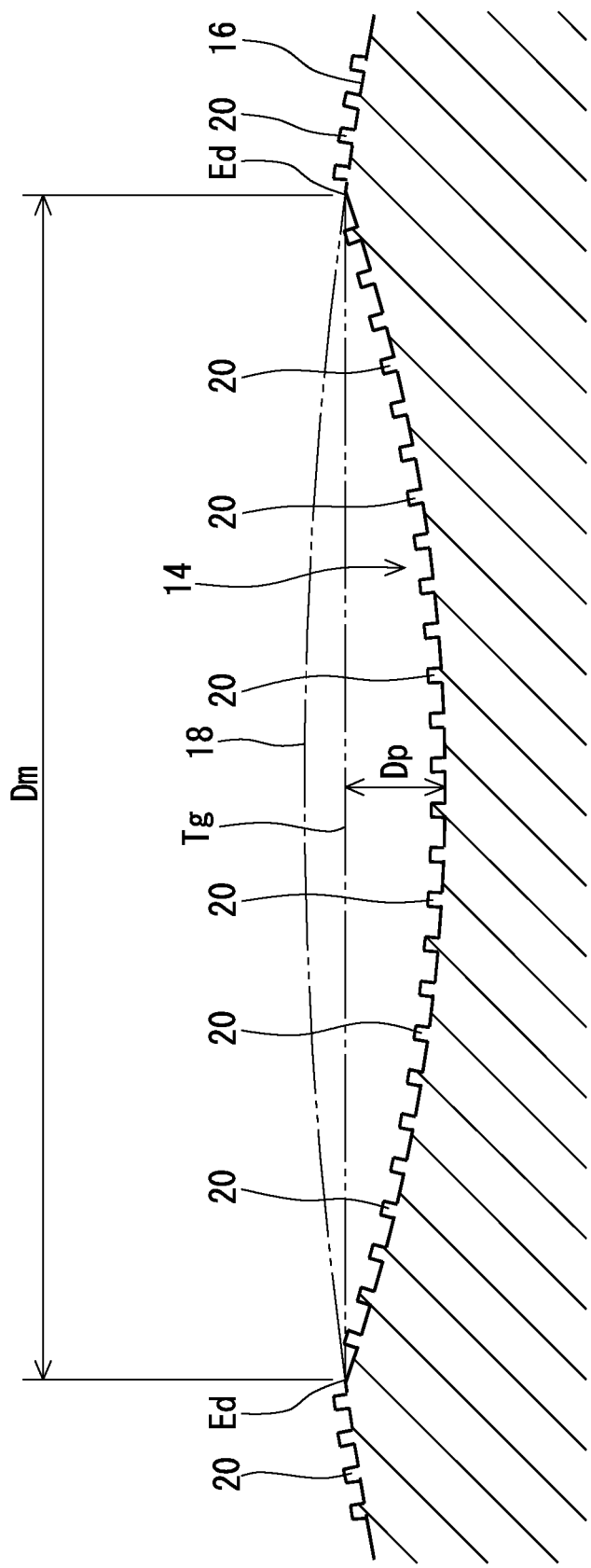
FIG. 4 is a partially enlarged cross-sectional view of the golf ball in FIG. 1.

FIG. 4 shows a cross section of the golf ball 2 along a plane passing through the central point of a dimple 14 and the central point of the golf ball 2. In FIG. 4, the top-to-bottom direction is the depth direction of the dimple 14. In FIG. 4, an alternate long and two short dashes line 18 indicates a phantom sphere. The surface of the phantom sphere 18 is the surface of the golf ball 2 when it is postulated that no dimple 14 and no exposed portion (described in detail later) exist. The diameter of the phantom sphere 18 is equal to the diameter of the golf ball 2. The dimple 14 is recessed from the surface of the phantom sphere 18. The land 16 coincides with the surface of the phantom sphere 18.

In FIG. 4, an arrow Dm indicates the diameter of the dimple 14. The diameter Dm is the distance between two tangent points Ed appearing on a tangent line Tg that is drawn tangent to the far opposite ends of the dimple 14. Each tangent point Ed is also the edge of the dimple 14. The edge Ed defines the contour of the dimple 14.

The diameter Dm of each dimple 14 is preferably not less than 2.0 mm and not greater than 6.0 mm. The dimple 14 having a diameter Dm of not less than 2.0 mm contributes to turbulization. From this viewpoint, the diameter Dm is more preferably not less than 2.5 mm and particularly preferably not less than 2.8 mm. The dimple 14 having a diameter Dm of not greater than 6.0 mm does not impair a fundamental feature of the golf ball 2 being substantially a sphere. From this viewpoint, the diameter Dm is more preferably not greater than 5.5 mm and particularly preferably not greater than 5.0 mm.

In the case of a non-circular dimple, a circular dimple 14 having the same area as that of the non-circular dimple is assumed. The diameter of the assumed dimple 14 can be regarded as the diameter of the non-circular dimple.

In FIG. 4, a double ended arrow Dp indicates the depth of the dimple 14. The depth Dp is the distance between the deepest part of the dimple 14 and the tangent line Tg. An average depth Dpav is calculated by summing the depths Dp of all the dimples 14 and dividing the sum of the depths Dp by the total number of the dimples 14. The average depth Dpav is preferably not less than 80 μm and not greater than 200 μm. With the golf ball 2 in which the average depth Dpav is not less than 80 μm, a large run can be achieved. From this viewpoint, the average depth Dpav is more preferably not less than 100 μm and particularly preferably not less than 110 μm. With the golf ball 2 in which the average depth Dpav is not greater than 200 μm, a large carry can be achieved. From this viewpoint, the average depth Dpav is more preferably not greater than 180 μm and particularly preferably not greater than 160 μm.

The area S of the dimple 14 is the area of a region surrounded by the contour line of the dimple 14 when the central point of the golf ball 2 is viewed at infinity. In the case of a circular dimple 14, the area S is calculated by the following mathematical formula.

$$S=(Dm/2)^2*\pi$$

From the viewpoint of achieving a sufficient total area of the dimples 14, the total number N of the dimples 14 is preferably not less than 250, more preferably not less than 280, and particularly preferably not less than 300. From the viewpoint that each dimple 14 can contribute to turbulization, the total number N is preferably not greater than 500, more preferably not greater than 450, and particularly preferably not greater than 400.

In the present invention, the "volume of the dimple" means the volume of a portion surrounded by the surface of the dimple 14 and the plane including the contour of the dimple 14. From the viewpoint that a large run can be achieved, the total volume of the dimples 14 is preferably not less than 240 mm$^3$, more preferably not less than 260 mm$^3$, and particularly preferably not less than 270 mm$^3$. From the viewpoint that a large carry can be achieved, the total volume is preferably not greater than 400 mm$^3$, more preferably not greater than 360 mm$^3$, and particularly preferably not greater than 330 mm$^3$.

Figure 5:
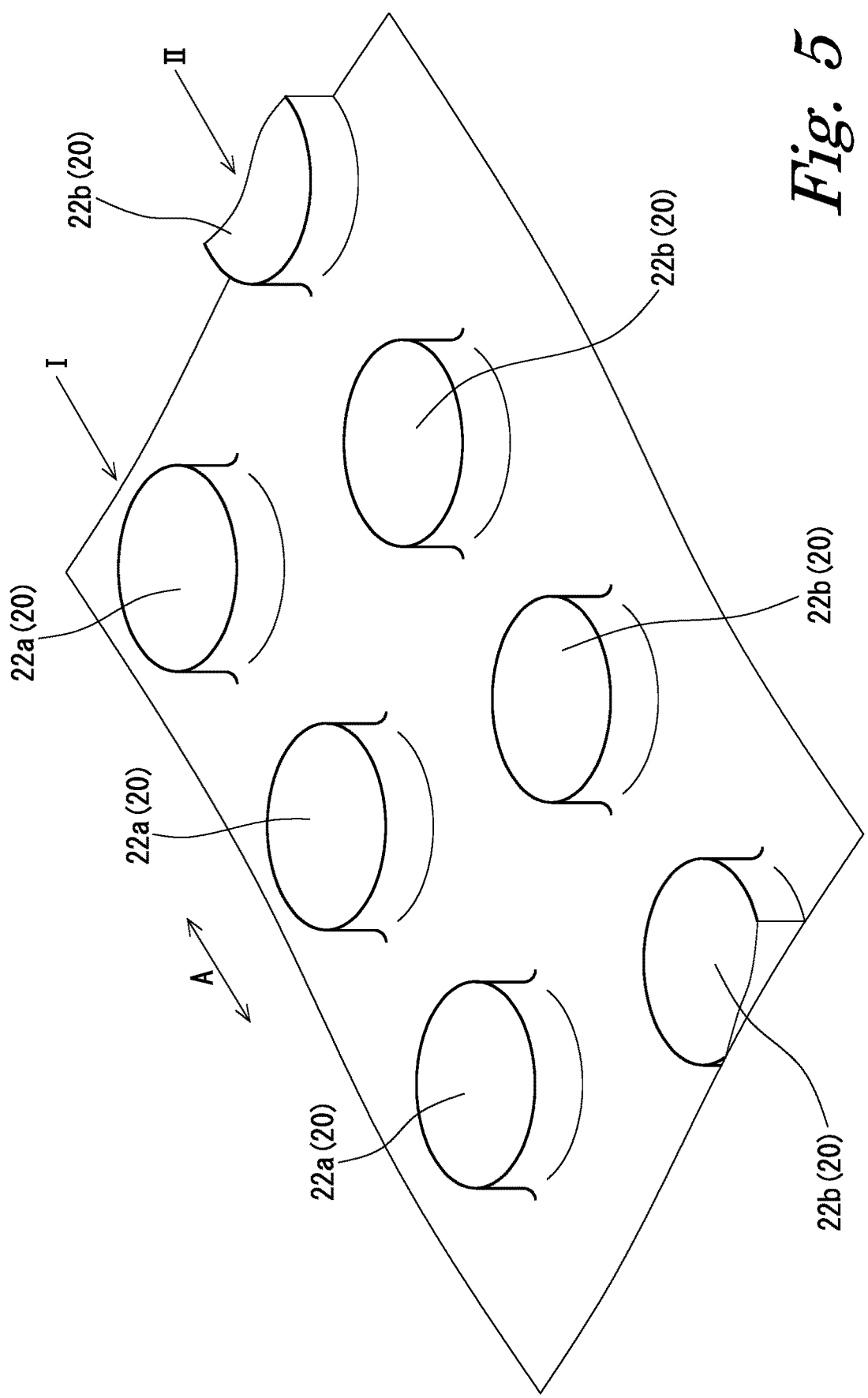
FIG. 5 is a partially enlarged perspective view of the surface of the golf ball in FIG. 1.

FIG. 5 is a partially enlarged perspective view of the surface of the golf ball 2 in FIG. 1. As described above, the golf ball 2 does not have a paint layer. Therefore, the surface of the cover 8 is the surface of the golf ball 2 shown in FIG. 5. As shown in FIG. 5, the cover 8 has a large number of minute projections 20 on the surface thereof. Each minute projection 20 generally has a cylindrical shape. As is obvious from FIG. 4, the minute projections 20 are formed on the surfaces of the dimples 14 and also on the surface of the land 16. Each minute projection 20 stands outward in the radial direction of the golf ball 2. The minute projections 20 may be formed only on the surfaces of the dimples 14. The minute projections 20 may be formed only on the surface of the land 16. Since a paint layer is not included, each minute projection 20 is exposed on the surface of the golf ball 2 as a whole. In the golf ball 2 that does not have a paint layer, the minute projection 20 is an exposed portion 22 (22a, 22b) as a whole.

When the golf ball 2 collides against the ground or rolls on the ground, mud may be brought into contact with the surface of the golf ball 2. The mud flows between an exposed portion 22 and another exposed portion 22 adjacent to this exposed portion 22 as a flow passage. Thus, the mud is less likely to adhere to the golf ball 2. The golf ball 2 is less likely to become stained. The golf ball 2 has excellent stain resistance.

Water easily flows between an exposed portion 22 and another exposed portion 22 adjacent to this exposed portion 22. Therefore, even if mud adheres to the surface of the golf ball 2, when the golf ball 2 is washed with water, the water flows while taking the dirt with it. Dirt is easily removed from the golf ball 2. The golf ball 2 has excellent washability.

The exposed portions 22 reduce the lift force of the golf ball 2 during flight. When a weak golf player hits the golf ball 2 with a driver, rising of the golf ball 2 is suppressed during flight. In addition, the exposed portions 22 also reduce drag. Therefore, with the golf ball 2, a large flight distance is obtained.

As described above, the golf ball 2 does not have a paint layer. Therefore, improvement of a spin rate due to a paint layer cannot be expected. However, with the golf ball 2, the exposed portions 22 directly come into contact with a clubface. The coefficient of friction of the golf ball 2 against the clubface is high. With the golf ball 2, a significant reduction in spin rate does not occur as compared to a conventional golf ball. The golf ball 2 has excellent controllability upon a shot with a short iron.

FIG. 5 shows a plurality of exposed portions 22a belonging to a first row I, and a plurality of exposed portions 22b belonging to a second row II. The direction indicated by an arrow A in FIG. 5 is the direction in which the rows extend. In each row, the exposed portions 22 are aligned at equal pitches. In other words, the exposed portions 22 are regularly aligned. The exposed portions 22a belonging to the first row I and the exposed portions 22b belonging to the second row II are arranged in a zigzag manner. On a part of the surface of the golf ball 2, the exposed portions 22 may be irregularly aligned. On the entire surface of the golf ball 2, the exposed portions 22 may be irregularly aligned.

Figure 6:
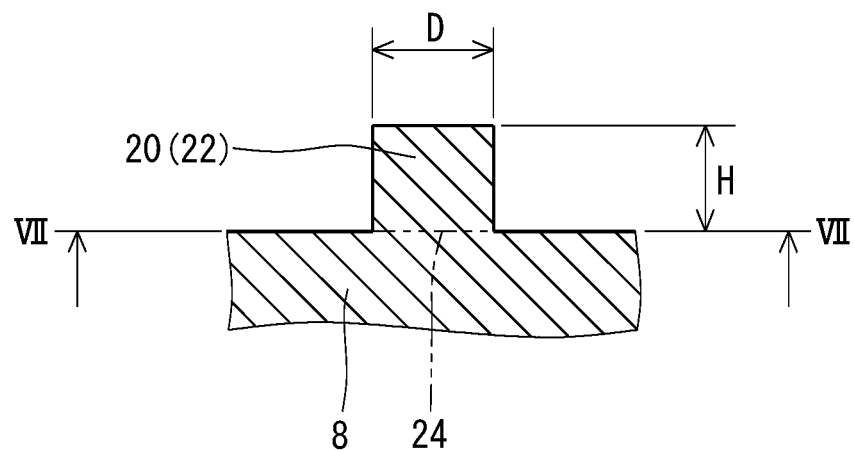
FIG. 6 is a partially enlarged cross-sectional view of the golf ball in FIG. 1.

FIG. 6 is a partially enlarged cross-sectional view of the golf ball 2 in FIG. 1. FIG. 6 shows the cover 8 which is a part of the main body 12. The cover 8 has the minute projections 20 (that is, the exposed portions 22). The exposed portions 22 stand outward in the radial direction of the golf ball 2. The exposed portions 22 are not covered with another member. In FIG. 6, reference character 24 indicates the bottom surface of the exposed portion 22.

Figure 7:
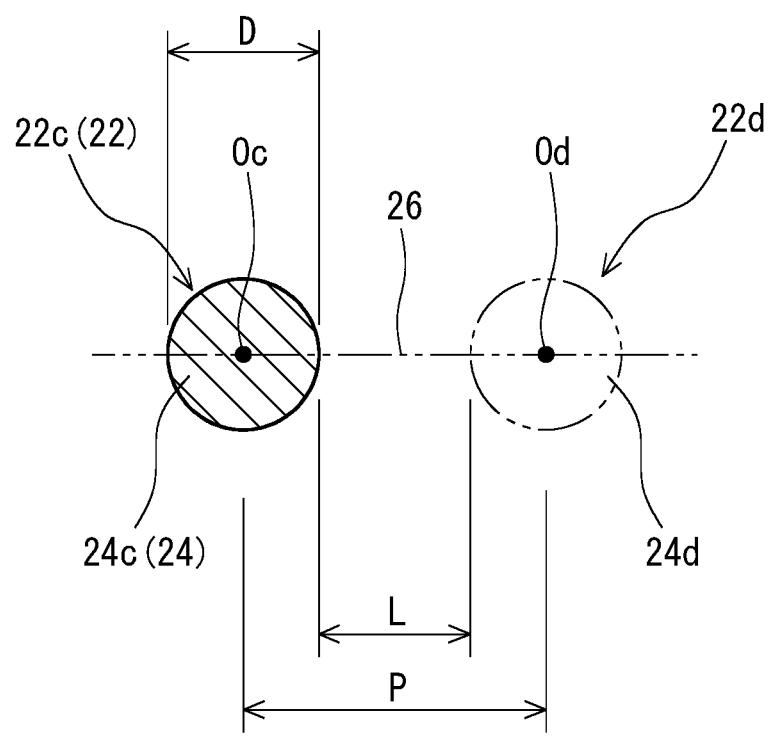
FIG. 7 is a cross-sectional view taken along a line VII-VII in FIG. 6.

FIG. 7 is a cross-sectional view taken along a line VII-VII in FIG. 6. FIG. 7 shows the bottom surface 24 of the exposed portion 22. As described above, each minute projection 20 has a cylindrical shape. Therefore, the shape of the bottom surface 24 of the exposed portion 22 is a circle.

In FIG. 7, an arrow D indicates the diameter of the bottom surface 24 and indicates the diameter of the exposed portion 22. An average diameter Dav is calculated by summing the diameters D of all the exposed portions 22 and dividing the sum of the diameters D by the number of the exposed portions 22. The average diameter Dav is preferably not less than 5 μm and not greater than 50 μm. The golf ball 2 in which the average diameter Dav is in the above range has excellent flight performance upon a shot with a driver by a weak golf player. This golf ball further has excellent controllability when being hit with a short iron. From these viewpoints, the average diameter Dav is more preferably not less than 15 μm and particularly preferably not less than 20 μm. From the same viewpoints, the average diameter Dav is more preferably not greater than 40 μm and particularly preferably not greater than 35 μm.

The area of each exposed portion 22 is defined as the area of the bottom surface 24. The area Sp of the exposed portion 22 shown in FIGS. 6 and 7 can be calculated by the following mathematical formula.

$$Sp=(D/2)^2*\pi$$

The ratio Pp of the sum of the areas Sp of all the exposed portions 22 to the surface area of the phantom sphere 18 of the golf ball 2 is preferably not less than 7%. The golf ball 2 in which the ratio Pp is not less than 7% has excellent flight performance upon a shot with a driver by a weak golf player. This golf ball further has excellent controllability when being hit with a short iron. From these viewpoints, the ratio Pp is preferably not less than 15% and particularly preferably not less than 20%. In light of ease of production of a mold for the golf ball 2, the ratio Pp is preferably not greater than 50%, more preferably not greater than 40%, and particularly preferably not greater than 35%.

FIG. 7 shows a bottom surface 24c of a first exposed portion 22c and also shows a bottom surface 24d of a second exposed portion 22d by an alternate long and two short dashes line. The second exposed portion 22d is adjacent to the first exposed portion 22c. In FIG. 7, an alternate long and two short dashes line 26 indicates a straight line passing through the center of gravity Oc of the bottom surface 24c of the first exposed portion 22c and the center of gravity Od of the bottom surface 24d of the second exposed portion 22d.

In FIG. 7, an arrow P indicates a pitch. The pitch P is the distance between the first exposed portion 22c and the second exposed portion 22d adjacent to the first exposed portion 22c. The pitch P is the distance between the center of gravity Oc of the bottom surface 24c of the first exposed portion 22c and the center of gravity Od of the bottom surface 24d of the second exposed portion 22d. The "second exposed portion 22d adjacent to the first exposed portion 22c" is the exposed portion 22 having a smallest distance L (described in detail later) to the first exposed portion 22c, among the exposed portions 22 present around the first exposed portion 22c.

For each exposed portion 22, one pitch P is determined. An average pitch Pav is calculated by summing the pitches P of all the exposed portions 22 and dividing the sum of the pitches P by the number of the exposed portions 22. The average pitch Pav is preferably not greater than 100 μm. The golf ball 2 in which the average pitch Pav is not greater than 100 μm has excellent flight performance upon a shot with a driver by a weak golf player. This golf ball further has excellent controllability when being hit with a short iron. From these viewpoints, the average pitch Pav is more preferably not greater than 80 μm and particularly preferably not greater than 70 μm. From the same viewpoints, the average pitch Pav is preferably not less than 10 μm, more preferably not less than 20 μm, and particularly preferably not less than 25 μm.

In FIG. 7, an arrow L indicates the distance between the first exposed portion 22c and the second exposed portion 22d adjacent to the first exposed portion 22c. The distance L is a value obtained by subtracting the radius of the bottom surface 24c of the first exposed portion 22c and the radius of the bottom surface 24d of the second exposed portion 22d from the pitch P. For each exposed portion 22, one distance L is determined. An average distance Lav is calculated by summing the distances L of all the exposed portions 22 and dividing the sum of the distances L by the number of the exposed portions 22. The average distance Lav is preferably not less than 5 μm and not greater than 50 μm. The golf ball 2 in which the average distance Lav is in this range has excellent flight performance upon a shot with a driver by a weak golf player. This golf ball further has excellent controllability when being hit with a short iron. From these viewpoints, the average distance Lav is particularly preferably not less than 10 μm and not greater than 40 μm.

In FIG. 6, an arrow H indicates the height of the minute projection 20 and indicates the height of the exposed portion 22. The height H is measured along the radial direction of the golf ball 2. An average height Hav is calculated by summing the heights H of all the exposed portions 22 and dividing the sum of the heights H by the number of the exposed portions 22. The average height Hav is preferably not less than 0.5 μm and not greater than 50 μm. The golf ball 2 in which the average height Hav is in this range has excellent flight performance upon a shot with a driver by a weak golf player. This golf ball further has excellent controllability when being hit with a short iron. From these viewpoints, the average height Hav is preferably not less than 2 μm and particularly preferably not less than 3 μm. From the same viewpoints, the average height Hav is more preferably not greater than 40 μm and particularly preferably not greater than 35 μm.

The total number of the exposed portions 22 is preferably not less than 10 thousand and not greater than 10 million. The golf ball 2 in which this total number is not less than 10 thousand has excellent flight performance upon a shot with a driver by a weak golf player. This golf ball further has excellent controllability when being hit with a short iron. From these viewpoints, this total number is more preferably not less than 20 thousand and particularly preferably not less than 50 thousand. A mold for the golf ball 2 in which this total number is not greater than 10 million is easily produced. From this viewpoint, this total number is more preferably not greater than 7 million and particularly preferably not greater than 5 million.

Figure 8:
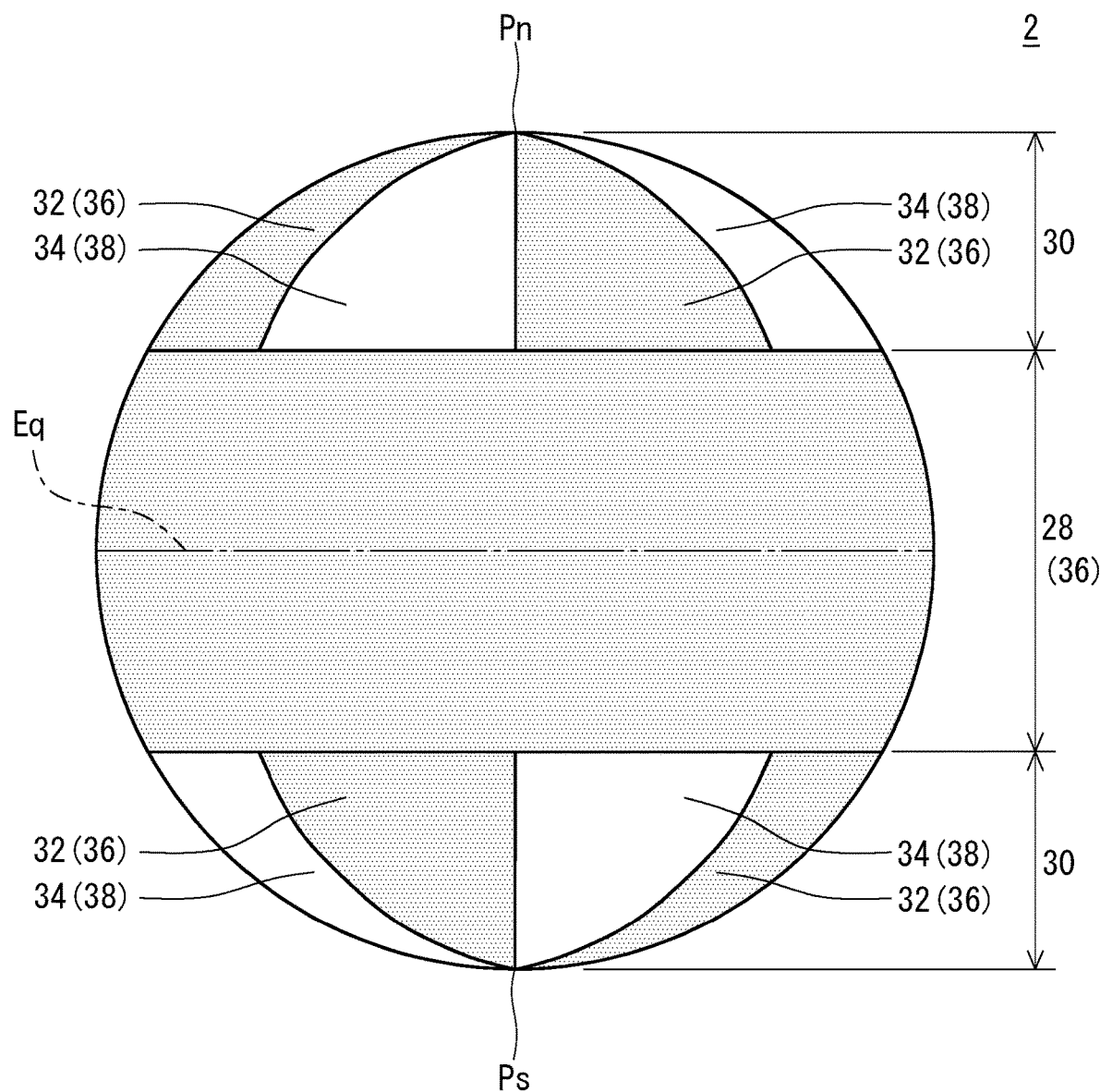
FIG. 8 is a schematic front view of the golf ball in FIG. 2.
Figure 9:
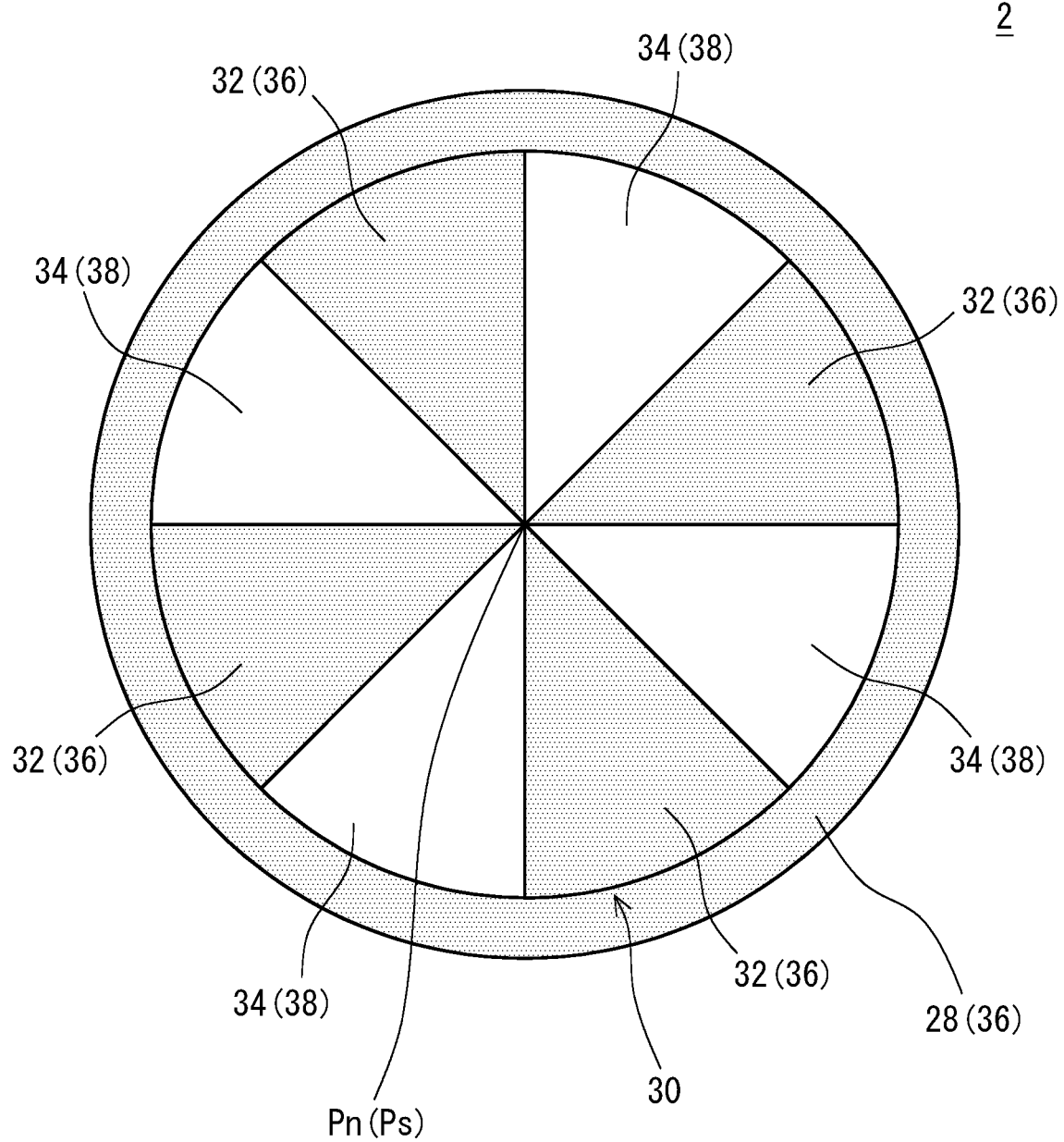
FIG. 9 is a schematic plan view of the golf ball in FIG. 3.

FIG. 8 is a front view of the golf ball 2 in FIG. 2, and FIG. 9 is a plan view of the golf ball 2. FIG. 9 is also a bottom view of the golf ball 2. For the sake of convenience of explanation of zones present on the surface of the golf ball 2, the golf ball 2 is schematically depicted in FIGS. 8 and 9. In FIGS. 8 and 9, the dimples 14 are not shown.

The golf ball 2 has one low-latitude portion 28 and two high-latitude portions 30. In FIGS. 8 and 9, for the convenience of explanation, the low-latitude portion 28 is filled with dots. Each high-latitude portion 30 has four first spherical triangles 32 and four second spherical triangles 34. In FIGS. 8 and 9, for the convenience of explanation, the first spherical triangles 32 are filled with dots. The second spherical triangles 34 are not filled. As shown in FIG. 9, these first spherical triangles 32 and these second spherical triangles 34 radially spread from the north pole Pn (or the south pole Ps) as a center. These first spherical triangles 32 and these second spherical triangles 34 are alternately arranged along the longitude direction. Since the golf ball 2 has two high-latitude portions 30, the total number of the first spherical triangles 32 is eight, and the total number of the second spherical triangles 34 is eight.

In the present embodiment, the low-latitude portion 28 is a first zone 36. Each first spherical triangle 32 is also a first zone 36. For the convenience of explanation, these first zones 36 are filled with dots. Meanwhile, each second spherical triangle 34 is a second zone 38. These second zones 38 are not filled.

The average value Hav1 of the heights H of all the exposed portions 22 belonging to all the first zones 36 is higher than the average value Hav2 of the heights H of all the exposed portions 22 belonging to all the second zones 38. On the surface of the golf ball 2, zones having a large average height Hav and zones having a small average height Hav coexist. The coexistence reduces the drag when the golf ball 2 is hit with a driver. The golf ball 2 has excellent flight performance upon a shot with a driver. Preferably, the average value of the heights H on each first zone 36 is higher than the average value of the heights H on any second zone 38.

Preferably, the average value Hav1 (μm) and the average value Hav2 (μm) satisfy the following mathematical formula.

$$3 \leq (Hav1 - Hav2) \leq 50$$

In other words, the difference (Hav1−Hav2) is preferably not less than 3 μm and not greater than 50 μm. With the golf ball 2, drag can be reduced. From this viewpoint, the difference (Hav1−Hav2) is more preferably not greater than 45 μm and particularly preferably not greater than 40 μm.

The average value Hav1 is preferably not less than 1 μm and not greater than 60 μm, and particularly preferably not less than 2 μm and not greater than 50 μm. The average value Hav2 is preferably not less than 0.0 μm and not greater than 55 μm, and particularly preferably not less than 1 μm and not greater than 50 μm. The second zone 38 in which the average value Hav2 is 0.0 μm does not have any exposed portions 22.

The golf ball 2 preferably satisfies the following mathematical formula.

$$1 \leq (S1/S2) \leq 19$$

In this mathematical formula, S1 represents the ratio of the total area of all the first zones 36 to the surface area of the phantom sphere 18 of the golf ball 2. In this mathematical formula, S2 represents the ratio of the total area of all the second zones 38 to the surface area of the phantom sphere 18 of the golf ball 2. The area of each first zone 36 is the area of a portion, covered by the first zone 36, of the surface of the phantom sphere 18. The area of each second zone 38 is the area of the portion, covered by the second zone 38, of the surface of the phantom sphere 18.

With the golf ball 2 that satisfies the above mathematical formula, that is, the golf ball 2 in which the ratio (S1/S2) is not less than 1 and not greater than 19, the drag is reduced when the golf ball 2 is hit with a driver. The golf ball 2 has excellent flight performance upon a shot with a driver. In light of flight performance, the ratio (S1/S2) is more preferably not less than 2 and particularly preferably not less than 3. In light of flight performance, the ratio (S1/S2) is more preferably not greater than 15 and particularly preferably not greater than 13.

Each first zone 36 preferably has an arithmetic average height Sa1 of not less than 1.0 μm and not greater than 40 μm. With the golf ball 2 in which the arithmetic average height Sa1 is not less than 1.0 μm, the exposed portions 22 reduce lift force and drag. With the golf ball 2, a large carry and a large run can be achieved. From this viewpoint, the arithmetic average height Sa1 is more preferably not less than 1.5 μm and particularly preferably not less than 2.0 μm. With the golf ball 2 in which the arithmetic average height Sa1 is not greater than 40 μm, the exposed portions 22 do not excessively reduce lift force. With the golf ball 2, a large carry can be achieved. From this viewpoint, the arithmetic average height Sa1 is more preferably not greater than 30 μm and particularly preferably not greater than 20 μm.

Each second zone 38 preferably has an arithmetic average height Sa2 of not less than 0.3 μm and not greater than 30 μm. With the golf ball 2 in which the arithmetic average height Sa2 is not less than 0.3 μm, the exposed portions 22 reduce lift force and drag. With the golf ball 2, a large carry and a large run can be achieved. From this viewpoint, the arithmetic average height Sa2 is more preferably not less than 0.5 μm and particularly preferably not less than 1.0 μm. With the golf ball 2 in which the arithmetic average height Sa2 is not greater than 30 μm, the exposed portions 22 do not excessively reduce lift force. With the golf ball 2, a large carry can be achieved. From this viewpoint, the arithmetic average height Sa2 is more preferably not greater than 25 μm and particularly preferably not greater than 15 μm.

Preferably, the arithmetic average height Sa1 of each first zone 36 is larger than the arithmetic average height Sa2 of any second zone 38. In other words, the arithmetic average height Sa1 of the first zone 36 having the smallest arithmetic average height Sa1 is preferably larger than the arithmetic average height Sa2 of the second zone 38 having the largest arithmetic average height Sa2. The difference between the arithmetic average height Sa1 of the first zone 36 having the smallest arithmetic average height Sa1 and the arithmetic average height Sa2 of the second zone 38 having the largest arithmetic average height Sa2 is preferably not less than 0.5 μm, more preferably not less than 1.0 μm, and particularly preferably not less than 2.0 μm. This difference is preferably not greater than 20 μm.

Each first zone 36 preferably has a maximum height Sz1 of not less than 7 μm and not greater than 200 μm. With the golf ball 2 in which the maximum height Sz1 is not less than 7 μm, the exposed portions 22 reduce lift force and drag. With the golf ball 2, a large carry and a large run can be achieved. From this viewpoint, the maximum height Sz1 is more preferably not less than 10 μm and particularly preferably not less than 20 μm. With the golf ball 2 in which the maximum height Sz1 is not greater than 200 μm, the exposed portions 22 do not excessively reduce lift force. With the golf ball 2, a large carry can be achieved. From this viewpoint, the maximum height Sz1 is more preferably not greater than 150 μm and particularly preferably not greater than 100 μm.

Each second zone 38 preferably has a maximum height Sz2 of not less than 3 μm and not greater than 200 μm. With the golf ball 2 in which the maximum height Sz2 is not less than 3 μm, the exposed portions 22 reduce lift force and drag. With the golf ball 2, a large carry and a large run can be achieved. From this viewpoint, the maximum height Sz2 is more preferably not less than 5 μm and particularly preferably not less than 10 μm. With the golf ball 2 in which the maximum height Sz2 is not greater than 200 μm, the exposed portions 22 do not excessively reduce lift force. With the golf ball 2, a large carry can be achieved. From this viewpoint, the maximum height Sz2 is more preferably not greater than 150 μm and particularly preferably not greater than 100 μm.

Preferably, the maximum height Sz1 of each first zone 36 is larger than the maximum height Sz2 of any second zone 38. In other words, the maximum height Sz1 of the first zone 36 having the smallest maximum height Sz1 is preferably larger than the maximum height Sz2 of the second zone 38 having the largest maximum height Sz2. The difference between the maximum height Sz1 of the first zone 36 having the smallest maximum height Sz1 and the maximum height Sz2 of the second zone 38 having the largest maximum height Sz2 is preferably not less than 0.5 μm, more preferably not less than 1.0 μm, and particularly preferably not less than 2.0 μm. This difference is preferably not greater than 20 μm.

The arithmetic average heights Sa1 and Sa2 and the maximum heights Sz1 and Sz2 are measured according to the standards of ISO-25178 with a laser microscope (for example, a non-contact type surface roughness/shape measuring instrument of Keyence Corporation). In the microscope, the surface of the golf ball 2 is scanned with a laser in an X direction and a Y direction. Through this scanning, unevenness data of the surface of the golf ball 2 is obtained. The arithmetic average heights and the maximum heights are calculated on the basis of a three-dimensional image obtained from the unevenness data. The measurement conditions are as follows.

Magnification: 1000
Measurement range X: 250 μm
Measurement range Y: 250 μm
Cutoff value: λc=0.25
Observation region: X=1024 pixels, Y=768 pixels
Total number of pixels: 786432 pixels For producing the golf ball 2, known molding methods can be used. Typical methods are compression molding and injection molding. In each of the methods, a mold having a plurality of pimples and a plurality of minute recesses on a cavity face thereof is used. The cover 8 is formed from materials introduced into the mold. The minute projections 20 having a shape that is the inverted shape of the minute recesses are formed on the cover 8. The minute projections 20 are the exposed portions 22.

In this production method, the shapes of the exposed portions 22 can be controlled in the design of the mold. The intention of the designer can be reflected in the arrangement of the exposed portions 22 of the golf ball 2 obtained by this production method. In the golf ball 2 obtained by this production method, a large number of the exposed portions 22 can be regularly or orderly arranged.

After the cover 8 is formed, the specifications of the exposed portions 22 may be adjusted by polishing the surface of the cover 8. The second zones 38 may be formed by selectively polishing parts of the surface of the cover 8.

A polyhedron may be used for arranging the first zones 36 and the second zones 38. The surface of the phantom sphere 18 is divided into a plurality of spherical polygons by comparting lines obtained by projecting the edge lines of a polyhedron, which is inscribed in the phantom sphere 18, onto the surface of the phantom sphere 18. A first zone 36 or a second zone 38 is assigned to each of the spherical polygons. Examples of preferable polyhedrons include regular polyhedrons and semi-regular polyhedrons. Examples of regular polyhedrons include a regular octahedron, a regular dodecahedron, and a regular icosahedron. Examples of semi-regular polyhedrons include a cuboctahedron and a dodecicosahedron. The surface of the phantom sphere 18 may be divided by a geodesic polyhedron.

Each dimple 14 may be formed as a first zone 36, and the land 16 may be formed as a second zone 38. Alternatively, each dimple 14 may be formed as a second zone 38, and the land 16 may be formed as a first zone 36.

The arrangement method for the first zones 36 and the second zones 38 is not limited to the above-described method. Any arrangement method can be used. The golf ball 2 may have zones that are not the first zones 36 and are not the second zones 38.

Figure 10:
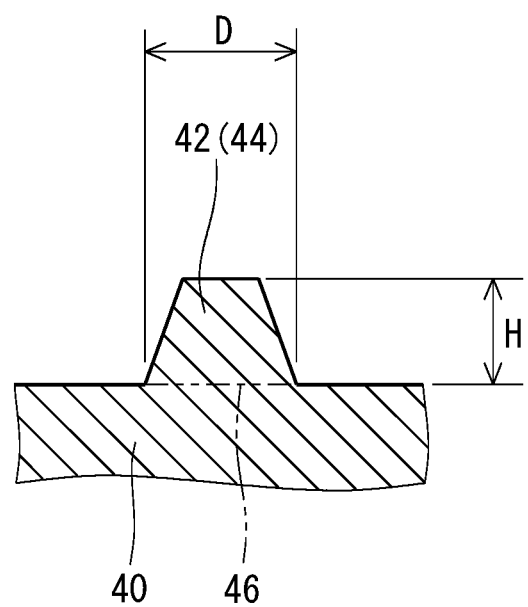
FIG. 10 is a cross-sectional view of a part of a golf ball according to another embodiment of the present invention.

FIG. 10 is a cross-sectional view of a part of a golf ball according to another embodiment of the present invention. FIG. 10 shows a cover 40 that is a part of a main body. The cover 40 has minute projections 42. This golf ball does not have a paint layer. Therefore, each minute projection 42 is an exposed portion 44 as a whole. In FIG. 10, reference character 46 indicates the bottom surface of the exposed portion 44.

Each minute projection 42 has a truncated cone shape. Therefore, each exposed portion 44 also has a truncated cone shape. The specifications of this golf ball excluding the shape of the minute projection 42 (that is, the shape of the exposed portion 44) are the same as the specifications of the golf ball 2 shown in FIGS. 1 to 9. This golf ball also has first zones 36 and second zones 38 as shown in FIGS. 8 and 9.

With this golf ball as well, the exposed portions 44 contribute to a flight distance upon a shot with a driver. With this golf ball as well, coexistence of the first zones 36 and the second zones 38 contributes to aerodynamic characteristics.

Figure 11:
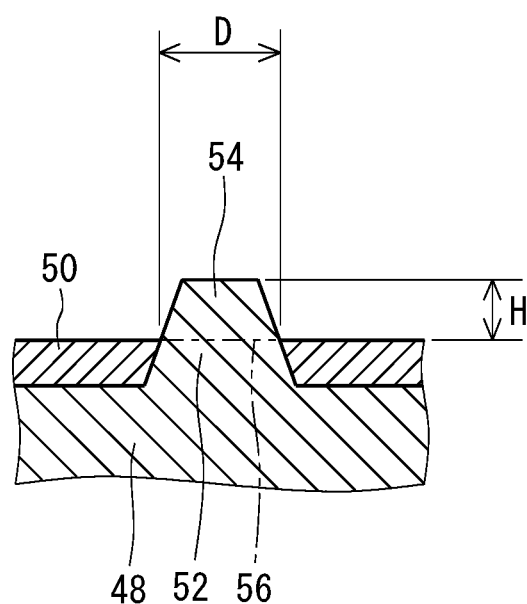
FIG. 11 is a cross-sectional view of a part of a golf ball according to still another embodiment of the present invention.

FIG. 11 is a cross-sectional view of a part of a golf ball according to still another embodiment of the present invention. This golf ball has a cover 48 and a paint layer 50. The cover 48 has minute projections 52. The paint layer 50 is thin. Therefore, a part of each minute projection 52 is not covered with the paint layer 50. In other words, a part of each minute projection 52 is exposed on the surface of the golf ball. This part is referred to as an exposed portion 54. The exposed portion 54 projects from the paint layer 50. In FIG. 11, reference character 56 indicates the bottom surface of the exposed portion 54. This golf ball also has first zones 36 and second zones 38 as shown in FIGS. 8 and 9.

With this golf ball as well, the exposed portions 54 contribute to a flight distance upon a shot with a driver. With this golf ball as well, coexistence of the first zones 36 and the second zones 38 contributes to aerodynamic characteristics.

For producing the golf ball, molding methods that are the same as those for producing the golf ball shown in FIGS. 1 to 9 can be used. Typical methods are compression molding and injection molding. In each of the methods, a mold having a plurality of pimples and a plurality of minute recesses on a cavity face thereof is used. The cover 48 is formed from materials introduced into the mold. The minute projections 52 having a shape that is the inverted shape of the minute recesses are formed on the cover 48. The paint layer 50 is formed on the cover 48. A part of each minute projection 52 is exposed from the paint layer 50 to form the exposed portion 54.

The golf ball may have minute projections having a shape such as a cone shape, a prism shape, a truncated pyramid shape, a pyramid shape, a partial sphere shape, and the like.

EXAMPLES

Example 1

A rubber composition was obtained by kneading 100 parts by weight of a high-cis polybutadiene (trade name "BR-730", manufactured by JSR Corporation), 27.4 parts by weight of zinc diacrylate, 5 parts by weight of zinc oxide, an appropriate amount of barium sulfate, 0.5 parts by weight of diphenyl disulfide, and 0.9 parts by weight of dicumyl peroxide. This rubber composition was placed into a mold including upper and lower mold halves each having a hemispherical cavity, and heated at 160° C. for 20 minutes to obtain a core with a diameter of 38.20 mm. The amount of barium sulfate was adjusted such that a core having a predetermined weight was obtained.

A resin composition was obtained by kneading 26 parts by weight of an ionomer resin (trade name "Himilan AM7337", manufactured by Du Pont-MITSUI POLYCHEMICALS Co., Ltd.), 26 parts by weight of another ionomer resin (trade name "Himilan AM7329", manufactured by Du Pont-MITSUI POLYCHEMICALS Co., Ltd.), 48 parts by weight of a styrene block-containing thermoplastic elastomer (trade name "TEFABLOC T3221C", manufactured by Mitsubishi Chemical Corporation), 4 parts by weight of titanium dioxide (A220), and 0.2 parts by weight of a light stabilizer (trade name "JF-90", manufactured by Johoku Chemical Co., Ltd.) with a twin-screw kneading extruder. The core was covered with this resin composition by injection molding to form a mid layer. The thickness of the mid layer was 1.00 mm.

A resin composition was obtained by kneading 47 parts by weight of an ionomer resin (trade name "Himilan 1555", manufactured by Du Pont-MITSUI POLYCHEMICALS Co., Ltd.), 46 parts by weight of another ionomer resin (trade name "Himilan 1557", manufactured by Du Pont-MITSUI POLYCHEMICALS Co., Ltd.), 7 parts by weight of a styrene block-containing thermoplastic elastomer (the aforementioned "TEFABLOC T3221C"), 4 parts by weight of titanium dioxide (A220), and 0.2 parts by weight of a light stabilizer (the aforementioned "JF-90") with a twin-screw kneading extruder. The sphere consisting of the core and the mid layer was placed into a final mold having a large number of pimples and minute recesses on its cavity face. The mid layer was covered with the resin composition by injection molding to form a cover. The thickness of the cover was 1.25 mm. Dimples having a shape that is the inverted shape of the pimples were formed on the cover. Furthermore, minute projections (exposed portions) having a shape that is the inverted shape of the minute recesses were formed on the cover.

Examples 2 to 11 and Comparative Examples 1 to 3

Golf balls of Examples 2 to 11 and Comparative Examples 1 to 3 were obtained in the same manner as Example 1, except the final mold was changed and exposed portions having specifications shown in Tables 1 to 3 below were formed. The second zone of the golf ball according to Example 5 does not have any exposed portions. In the golf ball according to Comparative Example 1, the exposed portions are uniformly arranged on the surface thereof.

Comparative Example 4

A golf ball of Comparative Example 4 was obtained in the same manner as Example 1, except the final mold was changed, a cover having no minute projections was formed, and a paint layer was provided on the cover.

[Spin Rate]

A sand wedge (trade name "CG15 Forged Wedge", manufactured by Roger Cleveland Golf Company, Inc., loft: 52°) was attached to a swing machine manufactured by Golf Laboratories, Inc. A golf ball was hit under a condition of a head speed of 16 m/sec, and the spin rate was measured. The average value of data obtained by 20 measurements is shown in Tables 1 to 3 below.

[Flight Test]

A driver (trade name "XXIO 10", manufactured by Sumitomo Rubber Industries, Ltd., shaft hardness: R, loft:) 11° was attached to a swing machine manufactured by Golf Laboratories, Inc. A golf ball was hit under a condition of a head speed of 35 m/sec, and the carry and the run were measured. The flight distance was calculated on the basis of the carry and the run. During the test, the weather was almost windless. The landing point was on flat lawn. The average value of data obtained by 20 measurements is shown in Tables 1 to 3 below.

TABLE 1

| | Results of Evaluation | | | | |
|---|---|---|---|---|---|
| | Compa. Example 1 | Compa. Example 2 | Example 2 | Example 1 | Example 3 |
| Paint | None | None | None | None | None |
| Front view | FIG. 2 | FIG. 2 | FIG. 2 | FIG. 2 | FIG. 2 |
| Plan view | FIG. 3 | FIG. 3 | FIG. 3 | FIG. 3 | FIG. 3 |
| Number of dimples | 338 | 338 | 338 | 338 | 338 |
| First zone | | | | | |
| $Dav1$ (μm) | 15 | 15 | 15 | 15 | 25 |
| $Pav1$ (μm) | 37.5 | 37.5 | 37.5 | 37.5 | 50 |

TABLE 1-continued

| | Results of Evaluation | | | | |
|---|---|---|---|---|---|
| | Compa. Example 1 | Compa. Example 2 | Example 2 | Example 1 | Example 3 |
| $Pp1$ (%) | 14.5% | 14.5% | 14.5% | 14.5% | 22.7% |
| $Hav1$ (μm) | 5 | 0.5 | 5 | 5 | 5 |
| $S1$ | 1.00 | 0.82 | 0.82 | 0.82 | 0.82 |
| Second zone | | | | | |
| $Dav2$ (μm) | — | 15 | 15 | 15 | 25 |
| $Pav2$ (μm) | — | 37.5 | 37.5 | 37.5 | 50 |
| $Pp2$ (%) | — | 14.5% | 14.5% | 14.5% | 22.7% |
| $Hav2$ (μm) | — | 0.2 | 3 | 2 | 2 |
| $S2$ | — | 0.18 | 0.18 | 0.18 | 0.18 |
| $S1/S2$ | — | 4.56 | 4.56 | 4.56 | 4.56 |
| $Hav1 - Hav2$ | — | 0.3 | 2.0 | 3.0 | 3.0 |
| $Hav$ (μm) | 5.0 | 0.4 | 4.6 | 4.5 | 4.5 |
| SW spin (rpm) | 3980 | 3870 | 3900 | 3960 | 3930 |
| W#1 flight distance (m) | 165.7 | 165.8 | 167.5 | 168.2 | 167.8 |

$Dav1$: the average value of the diameters D of the minute projections in the first zone.
$Pav1$: the average value of the pitches P of the minute projections in the first zone.
$Pp1$: the area percentage of the minute projections in the first zone.
$Dav2$: the average value of the diameters D of the minute projections in the second zone.
$Pav2$: the average value of the pitches P of the minute projections in the second zone.
$Pp2$: the area percentage of the minute projections in the second zone.

TABLE 2

| | Results of Evaluation | | | | |
|---|---|---|---|---|---|
| | Example 4 | Example 5 | Example 6 | Compa. Example 3 | Example 7 |
| Paint | None | None | None | None | None |
| Front view | FIG. 2 | FIG. 2 | FIG. 2 | FIG. 2 | FIG. 2 |
| Plan view | FIG. 3 | FIG. 3 | FIG. 3 | FIG. 3 | FIG. 3 |
| Number of dimples | 338 | 338 | 338 | 338 | 338 |
| First zone | | | | | |
| $Dav1$ (μm) | 25 | 15 | 15 | 15 | 15 |
| $Pav1$ (μm) | 50 | 37.5 | 37.5 | 37.5 | 37.5 |
| $Pp1$ (%) | 22.7% | 14.5% | 14.5% | 14.5% | 14.5% |
| $Hav1$ (μm) | 5 | 3 | 12 | 60 | 5 |
| $S1$ | 0.82 | 0.82 | 0.82 | 0.82 | 0.18 |
| Second zone | | | | | |
| $Dav2$ (μm) | 15 | — | 15 | 15 | 15 |
| $Pav2$ (μm) | 37.5 | — | 37.5 | 37.5 | 37.5 |
| $Pp2$ (%) | 14.5% | — | 14.5% | 14.5% | 14.5% |
| $Hav2$ (μm) | 2 | 0 | 2 | 20 | 2 |
| $S2$ | 0.18 | 0.18 | 0.18 | 0.18 | 0.82 |
| $S1/S2$ | 4.56 | 4.56 | 4.56 | 4.56 | 0.22 |
| $Hav1 - Hav2$ | 3.0 | 3.0 | 10.0 | 40.0 | 3.0 |
| $Hav$ (μm) | 4.5 | 2.5 | 10.2 | 52.8 | 2.5 |
| SW spin (rpm) | 3940 | 3840 | 3950 | 3880 | 4060 |
| W#1 flight distance (m) | 167.6 | 167.1 | 168.3 | 165.9 | 166.3 |

TABLE 3

Results of Evaluation

Figure 12:
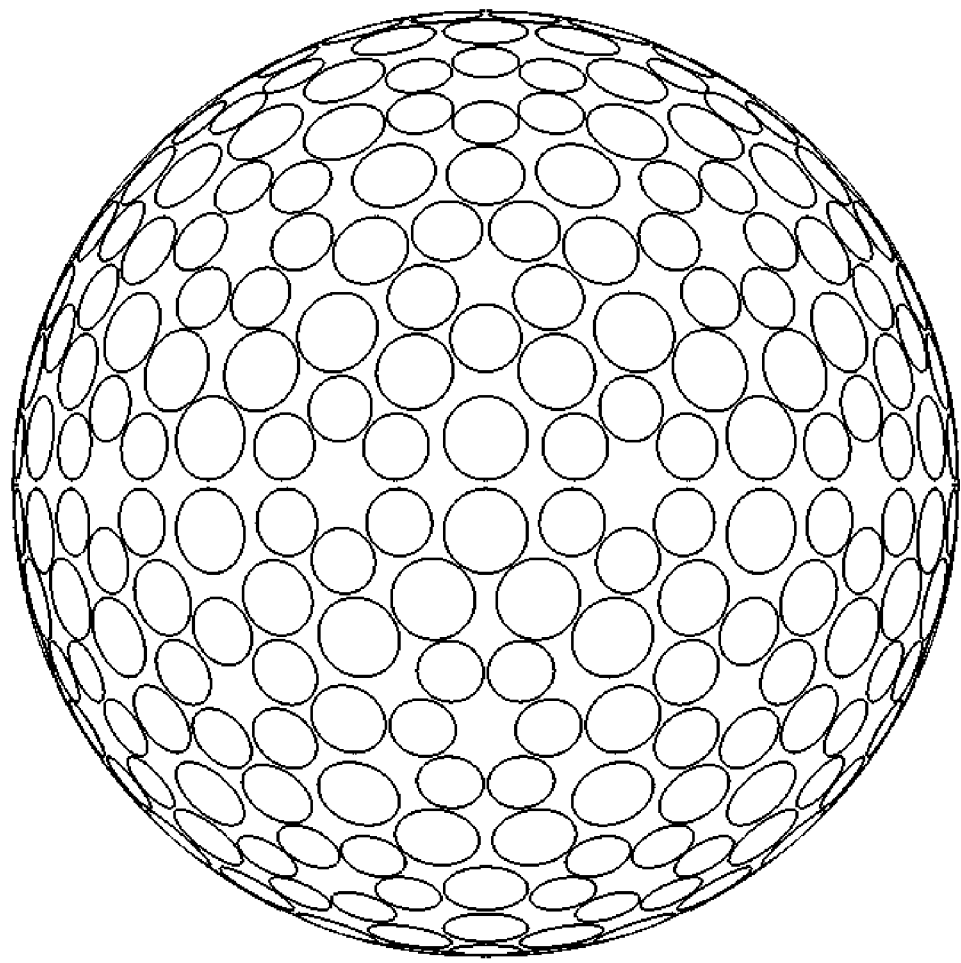
FIG. 12 is a front view of a golf ball according to Example 8 of the present invention.
Figure 13:
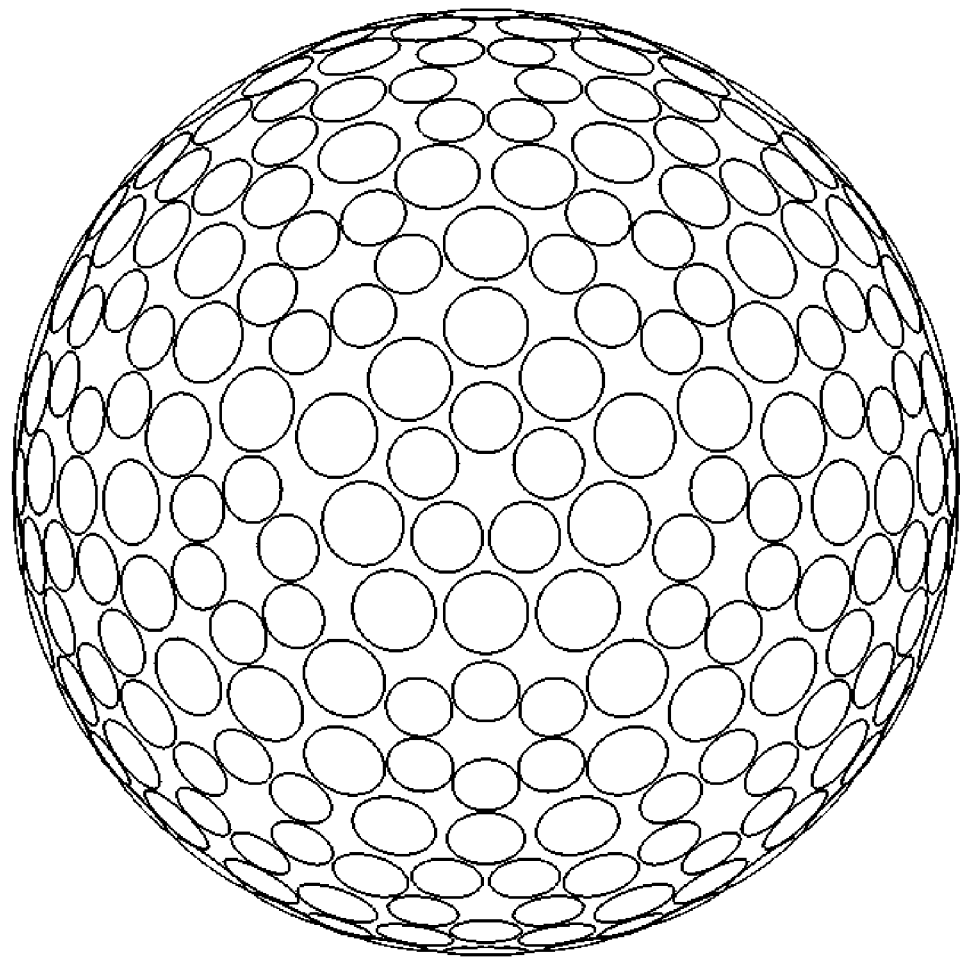
FIG. 13 is a plan view of the golf ball in FIG. 12.

|  | Example 8 | Example 9 | Example 10 | Example 11 | Compa. Example 4 |
|---|---|---|---|---|---|
| Paint | None | None | None | None | Present |
| Front view | FIG. 12 | FIG. 12 | FIG. 2 | FIG. 2 | FIG. 2 |
| Plan view | FIG. 13 | FIG. 13 | FIG. 3 | FIG. 3 | FIG. 3 |
| Number of dimples | 420 | 420 | 338 | 338 | 338 |
| First zone |  |  |  |  |  |
| Dav1 (μm) | 15 | 15 | 15 | 15 | — |
| Pav1 (μm) | 37.5 | 37.5 | 37.5 | 37.5 | — |
| Pp1 (%) | 14.5% | 14.5% | 14.5% | 14.5% | — |
| Hav1 (μm) | 5 | 5 | 5 | 5 | — |
| S1 | 0.35 | 0.65 | 0.95 | 0.96 | — |
| Second zone |  |  |  |  |  |
| Dav2 (μm) | 15 | 15 | 15 | 15 | — |
| Pav2 (μm) | 37.5 | 37.5 | 37.5 | 37.5 | — |
| Pp2 (%) | 14.5% | 14.5% | 14.5% | 14.5% | — |
| Hav2 (μm) | 2 | 2 | 2 | 2 | — |
| S2 | 0.65 | 0.35 | 0.05 | 0.04 | — |
| S1/S2 | 0.54 | 1.86 | 19.00 | 24.00 | — |
| Hav1 − Hav2 | 3.0 | 3.0 | 3.0 | 3.0 | — |
| Hav (μm) | 3.1 | 4.0 | 4.9 | 4.9 | — |
| SW spin (rpm) | 4010 | 3920 | 4020 | 4000 | 3820 |
| W#1 flight distance (m) | 166.6 | 166.9 | 166.7 | 166.5 | 165.5 |

As shown in Tables 1 to 3, the golf ball of each Example has excellent controllability upon a shot with a short iron. This golf ball further has excellent flight performance upon a shot with a driver at a low head speed. From the evaluation results, advantages of the present invention are clear.

The aforementioned minute projections are applicable to golf balls having various structures such as a one-piece golf ball, a two-piece golf ball, a four-piece golf ball, a five-piece golf ball, a six-piece golf ball, a thread-wound golf ball, and the like in addition to a three-piece golf ball. The above descriptions are merely illustrative examples, and various modifications can be made without departing from the principles of the present invention.

What is claimed is:

1. A golf ball comprising a core and a cover positioned outside the core, wherein
    the cover has a plurality of minute projections on a surface thereof,
    each minute projection has an exposed portion that is exposed on a surface of the golf ball,
    the exposed portion of the minute projection has an average diameter Dav that is not less than 5 μm and not greater than 50 μm,
    an average value Hav of heights H of the exposed portions is not less than 0.5 μm and not greater than 50 μm,
    the surface of the golf ball has one or more first zones and one or more second zones, and
    an average value Hav1 of the heights H of the exposed portions in the first zones is higher than an average value Hav2 of the heights H of the exposed portions in the second zones.

2. The golf ball according to claim 1, wherein a ratio S1 of a total area of the first zones to a surface area of a phantom sphere of the golf ball and a ratio S2 of a total area of the second zones to the surface area of the phantom sphere of the golf ball satisfy the following mathematical formula, $1 \leq (S1/S2) \leq 19$.

3. The golf ball according to claim 1, wherein the average value Hav1 and the average value Hav2 satisfy the following mathematical formula, $3 \leq (Hav1 - Hav2) \leq 50$.

4. The golf ball according to claim 1, wherein an arithmetic average height Sa1 of each first zone is larger than an arithmetic average height Sa2 of any second zone, and wherein the arithmetic average heights Sa1 and Sa2 are based on a three-dimensional image obtained from a laser microscope scanning of the golf ball surface to generate unevenness data and correspond to the average height of the surface of the golf ball as measured according to the standards of ISO-25178.

5. The golf ball according to claim 1, wherein a maximum height Sz1 of each first zone is larger than a maximum height Sz2 of any second zone.

6. The golf ball according to claim 1, further comprising a paint layer partially covering the cover, wherein the exposed portions project from the paint layer.

7. The golf ball according to claim 1, wherein an average pitch Pav of the exposed portion is not less than 10 μm and not greater than 100 μm.

8. The golf ball according to claim 1, wherein a total number of the exposed portions is not less than 10 thousand and not greater than 10 million.

9. A method for producing a golf ball including a core and a cover positioned outside the core, the method comprising the steps of:
    introducing a material into a mold having a plurality of minute recesses on a cavity face thereof; and
    forming the cover having exposed portions having a shape that is an inverted shape of the minute recesses, from the material,
    wherein
    the exposed portions have an average diameter Dav that is not less than 5 μm and not greater than 50 μm,
    an average value Hav of heights H of the exposed portions is not less than 0.5 μm and not greater than 50 m,
    a surface of the golf ball has one or more first zones and one or more second zones, and
    an average value Hav1 of the heights H of the exposed portions in the first zones is higher than an average value Hav2 of the heights H of the exposed portions in the second zones.

10. The method for producing the golf ball according to claim 9, wherein an average pitch Pav of the exposed portion is not less than 10 μm and not greater than 100 μm.

11. The method for producing the golf ball according to claim 9, wherein a total number of the exposed portions is not less than 10 thousand and not greater than 10 million.

12. A method for producing a golf ball including a core and a cover positioned outside the core, the method comprising the steps of:
    introducing a material into a mold having a plurality of minute recesses on a cavity face thereof;
    forming the cover having minute projections having a shape that is an inverted shape of the minute recesses, from the material; and
    forming a paint layer on a surface of the cover such that parts of the minute projections are exposed from the paint layer to form exposed portions,
    wherein
    the exposed portions have an average diameter Dav that is not less than 5 μm and not greater than 50 μm,
    an average value Hav of heights H of the exposed portions is not less than 0.5 μm and not greater than 50 μm, a surface of the golf ball has one or more first zones and one or more second zones, and an average value Hav1 of the heights H of the exposed portions in the first zones is higher than an average value Hav2 of the heights H of the exposed portions in the second zones.

13. The method for producing the golf ball according to claim 12, wherein an average pitch Pav of the exposed portion is not less than 10 μm and not greater than 100 μm.

14. The method for producing the golf ball according to claim 12, wherein a total number of the exposed portions is not less than 10 thousand and not greater than 10 million.

* * * * *